(12) United States Patent
Chen et al.

(10) Patent No.: US 11,846,988 B2
(45) Date of Patent: Dec. 19, 2023

(54) HEAD-MOUNTED DISPLAY DEVICE

(71) Applicant: HTC Corporation, Taoyuan (TW)

(72) Inventors: Yen Chun Chen, Taoyuan (TW); Meng Yu Jian, Taoyuan (TW); Chih-Ting Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/676,839

(22) Filed: Feb. 22, 2022

(65) Prior Publication Data

US 2023/0079999 A1   Mar. 16, 2023

Related U.S. Application Data

(60) Provisional application No. 63/243,213, filed on Sep. 13, 2021.

(51) Int. Cl.
*G06F 1/16* (2006.01)

(52) U.S. Cl.
CPC .................... *G06F 1/163* (2013.01)

(58) Field of Classification Search
CPC ............ G06F 1/163; G02B 2027/0152; G02B 27/0176
See application file for complete search history.

(56) References Cited

U.S. PATENT DOCUMENTS

| | | | | |
|---|---|---|---|---|
| 7,962,972 | B2 * | 6/2011 | Nakabayashi | G02B 27/0176 2/421 |
| 8,777,406 | B2 | 7/2014 | Sugihara et al. | |
| 10,034,508 | B2 * | 7/2018 | Frank | G02B 27/0176 |
| 10,617,025 | B1 * | 4/2020 | Chen | H05K 5/0217 |
| 10,747,005 | B1 * | 8/2020 | Sullivan | G02B 27/0176 |
| 10,969,606 | B2 * | 4/2021 | Chang | G02C 5/143 |
| 11,163,333 | B2 * | 11/2021 | Lin | H04N 5/7491 |

(Continued)

FOREIGN PATENT DOCUMENTS

| CN | 208953797 | | 6/2019 |
|---|---|---|---|
| CN | 111273450 | A * | 6/2020 |

(Continued)

OTHER PUBLICATIONS

"Office Action of Taiwan Counterpart Application", dated Aug. 2, 2022, p. 1-p. 4.

(Continued)

*Primary Examiner* — Rockshana D Chowdhury
(74) *Attorney, Agent, or Firm* — JCIPRNET

(57) ABSTRACT

A head-mounted display device includes a front-end assembly, a plurality of support arms, a plurality of counterweight parts and a plurality of brackets. The plurality of support arms are respectively connected to the front-end assembly. The plurality of counterweight parts are respectively slidably arranged to the plurality of support arms and away from the front assembly. The plurality of brackets are respectively connected to the plurality of counterweight parts and used for contacting the head of the user. The brackets are separated from each other. Each of the brackets has an upper part and a lower part. The upper parts of the brackets are adapted to support the upper part of the back of the user's head. The lower parts of the brackets are adapted to support the lower part of the back of the user's head.

8 Claims, 4 Drawing Sheets

(56) References Cited

U.S. PATENT DOCUMENTS

| | | | |
|---|---|---|---|
| 11,768,518 B1* | 9/2023 | Jo | G06F 1/163 |
| | | | 361/679.03 |
| 2006/0070168 A1* | 4/2006 | Nakabayashi | G02B 27/0176 |
| | | | 2/171 |
| 2012/0169948 A1 | 7/2012 | Kim et al. | |
| 2016/0363772 A1* | 12/2016 | Miller | G02B 27/0176 |
| 2018/0017208 A1* | 1/2018 | Shanley, IV | F16M 13/04 |
| 2018/0157044 A1 | 6/2018 | Choi et al. | |
| 2020/0089009 A1* | 3/2020 | Lee | G02B 27/0176 |
| 2020/0225492 A1* | 7/2020 | Williams | G02B 27/0176 |
| 2020/0371365 A1 | 11/2020 | Kamakura | |
| 2021/0080996 A1* | 3/2021 | Hudman | A42B 3/042 |

FOREIGN PATENT DOCUMENTS

| | | |
|---|---|---|
| TW | 201930957 | 8/2019 |
| TW | 202020505 | 6/2020 |

OTHER PUBLICATIONS

"Mantis-Detachable Headphones for Playstation VR", retrieved from "https://www.bionikgaming.com/products/mantis", pp. 1-7.

* cited by examiner

HEAD-MOUNTED DISPLAY DEVICE

CROSS-REFERENCE TO RELATED APPLICATION

This application claims the priority benefit of U.S. provisional application Ser. No. 63/243,213, filed on Sep. 13, 2021. The entirety of the above-mentioned patent application is hereby incorporated by reference herein and made a part of this specification.

BACKGROUND

Technical Field

The disclosure relates to a display device, and in particular to a head-mounted display device.

Description of Related Art

The more common type of display devices currently used for virtual reality is a head-mounted display device, but the weight of this type of head-mounted display device is concentrated on its front assembly. This results in a situation where the front is heavy and the back is light when the user is wearing it, which in turn causes the head-mounted display device to easily fall off or be displaced from the user's head due to insufficient stability during dynamic movement. Therefore, how to increase the wearing stability of the head-mounted display device has become one of the problems that need to be solved urgently.

SUMMARY

The present application provides a head-mounted display device that can increase wearing stability.

The application provides a head-mounted display device which includes a front-end assembly, a plurality of support arms, a plurality of counterweight parts and a plurality of brackets. The plurality of support arms are respectively connected to the front-end assembly. The plurality of counterweight parts are respectively slidably arranged to the plurality of support arms and away from the front assembly. The plurality of brackets are respectively connected to the plurality of counterweight parts and used for contacting the head of the user. The brackets are separated from each other. Each of the brackets has an upper part and a lower part. The upper parts of the brackets are adapted to support the upper part of the back of the user's head. The lower parts of the brackets are adapted to support the lower part of the back of the user's head.

Based on the above, in the present application, the distance between the counterweight parts and the front-end assembly can be adjusted to increase wearing stability. In addition, the positions of the slidable brackets on the support arms can be adjusted by the counterweight parts to conform to the size of the user's head, thereby increasing the wearing stability.

DESCRIPTION OF THE EMBODIMENTS

Figure 1A:
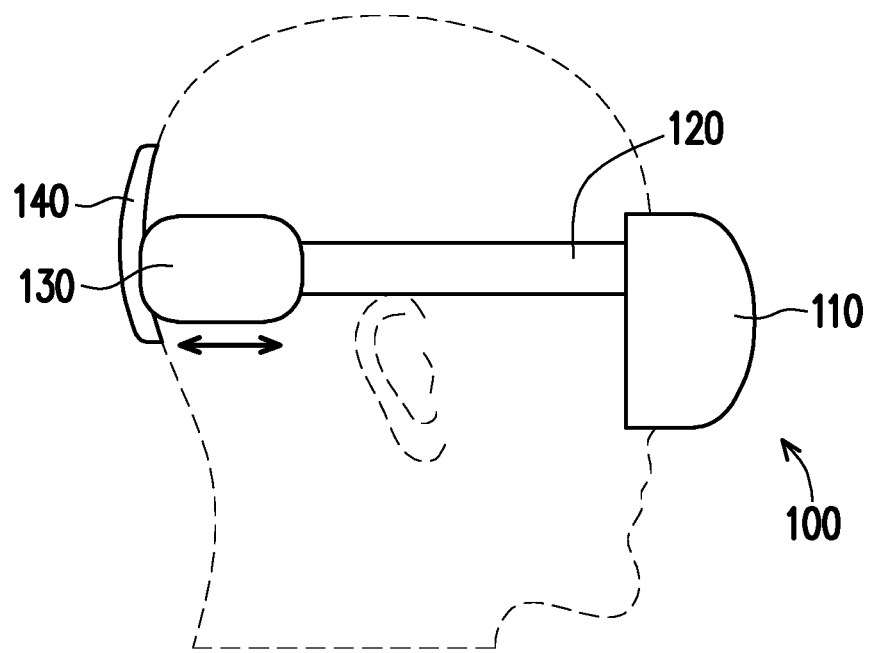
FIG. 1A is a schematic diagram of a head-mounted display device according to an embodiment of the present invention.
Figure 1B:
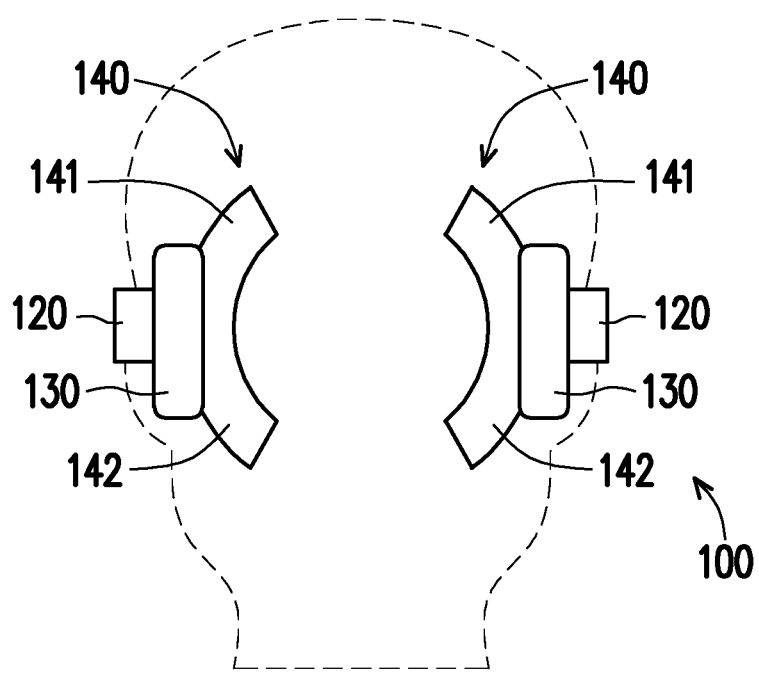
FIG. 1B is a schematic diagram of the head-mounted display device of FIG.1A from another viewing angle.

Referring to FIGS. 1A and 1B, in an embodiment of the present invention, a head-mounted display device 100 includes a front-end assembly 110, a plurality of support arms 120, a plurality of counterweight parts 130 and a plurality of brackets 140. The plurality of support arms 120 are respectively connected to the front-end assembly 110. The plurality of counterweight parts 130 are respectively arranged to the plurality of support arms 120, and each of the counterweight parts 130 can slide relative to the corresponding support arms 120. The counterweight parts 130 is disposed away from the front-end assembly 110. In the embodiment, the number of the support arms 120, the counterweight parts 130 and the brackets 140 is two. In other embodiments, the number of the support arms 120, the counterweight parts 130 or the brackets 140 may also be three or more, but not limited thereto. In addition, the counterweight parts 130 can be a battery module or a speaker module, or other components, which help to cooperate with the front-end assembly 110 to increase wearing stability. Therefore, the head-mounted display device 100 can increase wearing stability by adjusting the distance between the counterweight parts 130 and the front-end assembly 110.

Referring to FIGS. 1A and 1B, each of the counterweight parts 130 is connected to a bracket 140 to rest against the back of the user's head. When the counterweight part 130 slides relative to the support arm 120, the bracket 140 slides relative to the support arm 120 together with the counterweight part 130. In this embodiment, the bracket 140 can be slid relative to the support arm 120 by adjusting the counterweight part 130 to conform to the size of the user's head. For example, the position of the counterweight part 130 is approximately corresponding to the user's ear, so as to increase wearing stability.

In the embodiment, the front-end assembly 110 may include components such as an optical system (not shown) and a protective casing, and may be provided with a display or be suitable for placing a display. The aforementioned display may be a built-in display or an external portable display (such as a smart phone, etc.), but the application is not limited thereto. The types of the aforementioned displays can be adjusted according to the application of the head-mounted display device 100 in a virtual reality system, an augmented reality system or a mixed reality system. The optical system includes optical elements for changing the optical path of the display, such as lenses, light guides, or lenses. The optical system includes optical elements for changing the optical path of the display, such as lenses, light guides, or prisms.

In the embodiment, the brackets 140 are separated from each other. Each of the brackets 140 has an upper part 141 and a lower part 142. The upper parts 141 of the brackets 140 are adapted to support the upper part of the back of the user's head, so as to increase the wearing stability of the user during static activities. The lower parts 142 of the brackets 140 are adapted to support the lower part of the back of the user's head, so as to improve the wearing stability of the user during dynamic activities. For example, to improve the stability of dynamic behaviors such as looking up and down. Through the cooperation of the upper parts 141 and the lower parts 142 of the bracket 140, the clamping effect of the head-mounted display device 100 can be increased. In this way, when the user wears the head-mounted display device 100, a good wearing effect can be provided no matter under dynamic activity or under static activity.

Figure 1C:
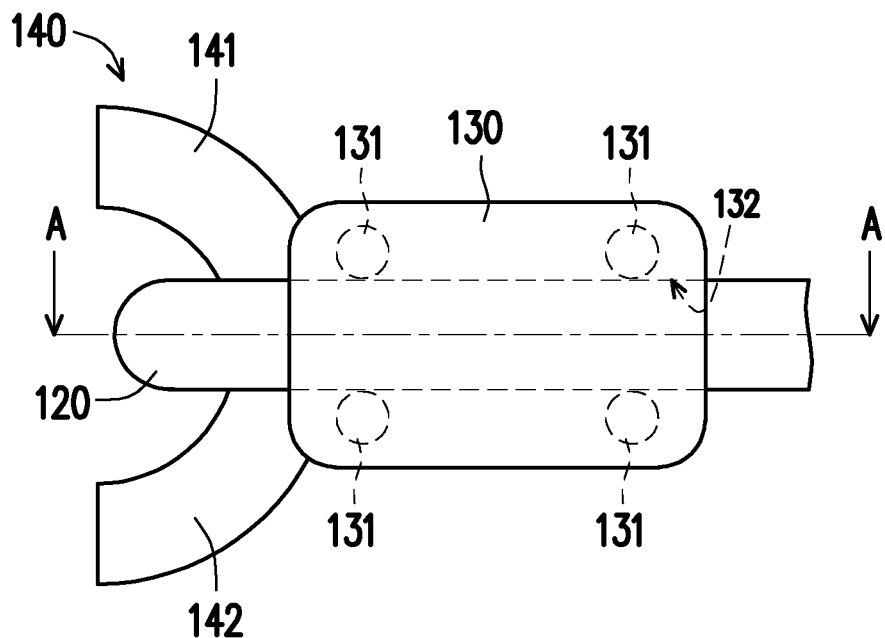
FIG. 1C is a partial enlarged view of FIG. 1A.
Figure 1D:
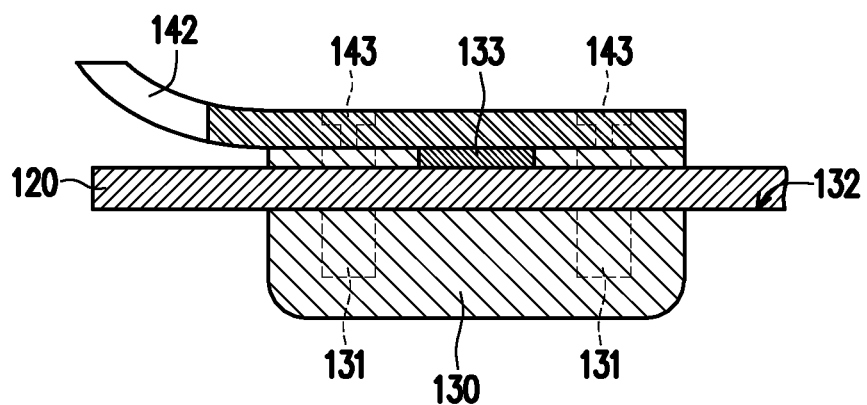
FIG. 1D is a cross-sectional view taken along line A-A of FIG. 1C.

Referring to FIGS. 1C and 1D, each of the counterweight parts 130 has a plurality of first screw components 131 and a channel 132. The first screw components 131 are respectively arranged on opposite sides of the channel 132, and the support arms 120 pass through the channel 132. Each of the brackets 140 further has a plurality of second screw components 143. The second screw components 143 respectively pass through the corresponding bracket 140 and is respectively locked to the first screw components 131, so that the brackets 140 are locked to the counterweight parts 130. Each of the counterweight parts 130 further has a damping part 133. The damping part 133 is arranged beside the channel 132 to contact the support arm 120. In the embodiment, the damping part 133 provides friction when the counterweight part 130 slides relative to the support arm 120, so as to increase the feel of the counterweight parts 130 when sliding.

In other embodiment, the counterweight part 130 can also be fixed at one end of the support arm 120 and away from the front-end assembly 110 to simplify the design. In addition, the counterweight part 130 may also be fixed at other positions of the support arm 120 as long as it cooperates with the front-end assembly 110, so that the head-mounted display device 100 can be stably worn on the user's head.

Figure 2:
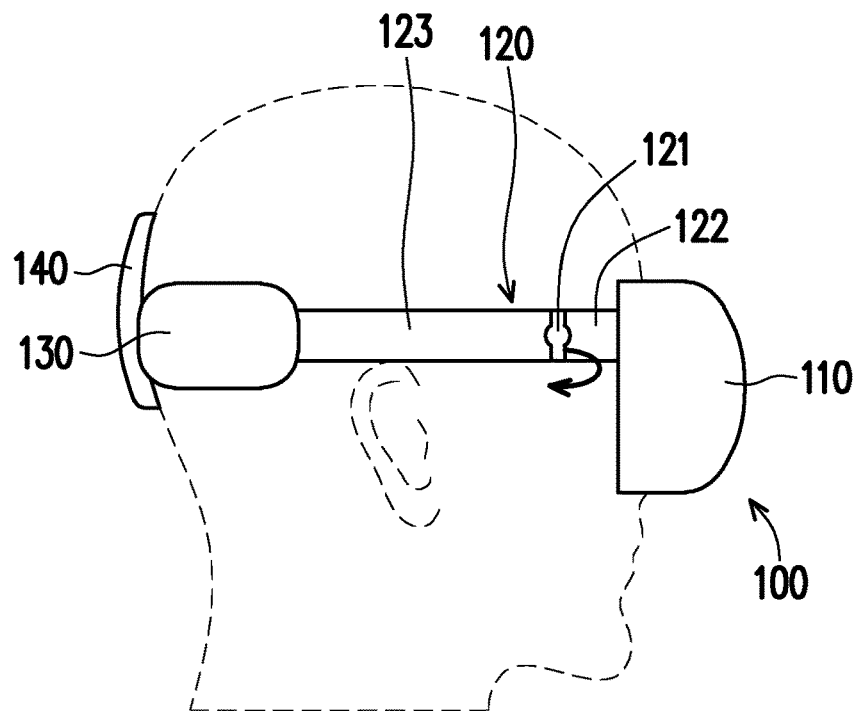
FIG. 2 is a schematic diagram of a head-mounted display device according to another embodiment of the present invention.

Referring to FIG. 2, the embodiment of FIG. 2 is substantially the same as the embodiment of FIG. 1A. Compared with the embodiment of FIG. 1A, the support arm 120 of the embodiment of FIG. 2 includes a pivot 121 and a first section 122 and a second section 123 opposite to each other. The pivot 121 is disposed between the first section 122 and the second section 123, so that the second section 123 can pivot relative to the first section 122. When the second section 123 is pivoted relative to the first section 122 to be close to the front-end assembly 110, the head-mounted display device 100 occupies a smaller space, which is beneficial for the storage of the head-mounted display device 100.

Figure 3:
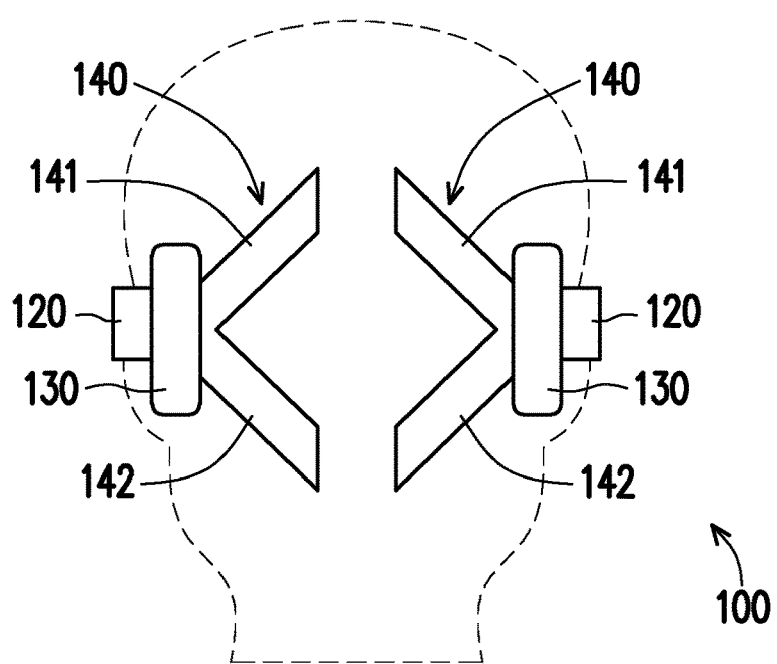
FIG. 3 is a schematic diagram of a head-mounted display device according to another embodiment of the present invention.

Referring to FIG. 3, the embodiment of FIG. 3 is substantially the same as the embodiment of FIG. 1B. In the embodiment of FIG. 1B, the shape of the bracket 140 is two arcs opposite each other. Compared to the embodiment of FIG. 1B, in the embodiment of FIG. 3, the shape of the bracket 140 is two V-shapes opposite each other. The bracket 140 has an upper part 141 and a lower part 142. The upper parts 141 of the brackets 140 are adapted to support the upper part of the back of the user's head, and the lower parts 142 of the brackets 140 are adapted to support the lower part of the back of the user's head. In other embodiments, the bracket can also be in other shapes to support the upper and lower part of the back of the user's head.

Figure 4:
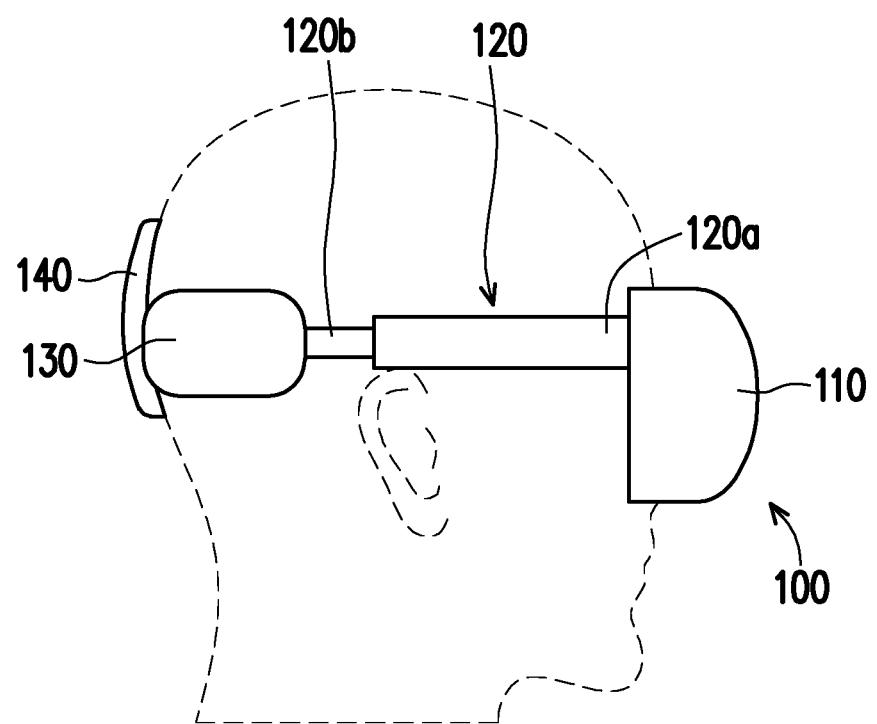
FIG. 4 is a schematic diagram of a head-mounted display device according to another embodiment of the present invention.

Referring to FIG. 4, the embodiment of FIG. 4 is substantially the same as the embodiment of FIG. 1A. Compared with the embodiment of FIG. 1A, each of the support arm 120 of the embodiment of FIG. 4 has a fixed part 120a and an adjustable part 120b. The adjustable part 120b can be telescopic relative to the fixed part 120a. That is to say, the adjustable part 120b can increase or shorten the total length of the support arm 120 after being adjusted so as to conform to the size of the user's head. In the embodiment, the fixed part 120a is connected to the front-end assembly 110, and the counterweight part 130 is slidably arranged on the adjustable part 120b to cooperate with the front-end assembly 110 to increase the wearing stability. In other embodiment, the counterweight part 130 can also be fixed on the adjustable part 120b, and the adjustable part 120b can be expanded and retracted relative to the fixed part 120a to conform to the size of the user's head.

To sum up, in the present application, the distance between the counterweight parts and the front-end assembly can be adjusted to increase wearing stability. In addition, the positions of the slidable brackets on the support arms can be adjusted by the counterweight parts to conform to the size of the user's head, thereby increasing the wearing stability.

What is claimed is:

1. A head-mounted display device, comprising:
   a front-end assembly;
   a plurality of support arms, respectively connected to the front-end assembly;
   a plurality of counterweight parts, respectively slidably arranged to and adapted to slide with respect to the plurality of support arms and away from the front assembly; and
   a plurality of brackets, respectively connected to the plurality of counterweight parts and used for contacting the head of the user, and the brackets are separated from each other, wherein each of the brackets has an upper part and a lower part, the upper parts of the brackets are adapted to support the upper part of the back of the user's head, the lower parts of the brackets are adapted to support the lower part of the back of the user's head, each of the support arms further has a fixed part and an adjustable part, each of the adjustable parts can be telescopic relative to the corresponding fixed part to increase or shorten a length of each of the support arms, and the counterweight parts are respectively slidably arranged to and inserted with the adjustable parts.

2. The head-mounted display device according to claim 1, wherein each of the support arms has two sections pivotally connected to each other.

3. The head-mounted display device according to claim 1, wherein each of the counterweight parts further has a channel, and each of the support arms is passed through the corresponding channel.

4. The head-mounted display device according to claim 3, wherein each of the counterweight parts further has a plurality of first screw components, the first screw components are respectively arranged on opposite sides of the channel, each of the brackets further has a plurality of second screw components, and each of the second screw components passes through the corresponding bracket and is locked to the corresponding first screw components.

5. The head-mounted display device according to claim 3, wherein each of the counterweight parts further has a damping part, and each of the damping part is arranged beside the corresponding channel to contact the corresponding support arm.

6. The head-mounted display device according to claim 5, wherein each of the damping parts is sandwiched between the corresponding support arm and the bracket.

7. The head-mounted display device according to claim 1, wherein a shape of each of the brackets is a pair of arcs facing each other or a pair of V-shapes facing each other.

8. The head-mounted display device according to claim 1, wherein the at least one of the counterweight parts is a battery module or a speaker module.

* * * * *